N. SHOEMAKER.
Grinding Mill.
No. 51,227.
Patented Nov. 28, 1865.
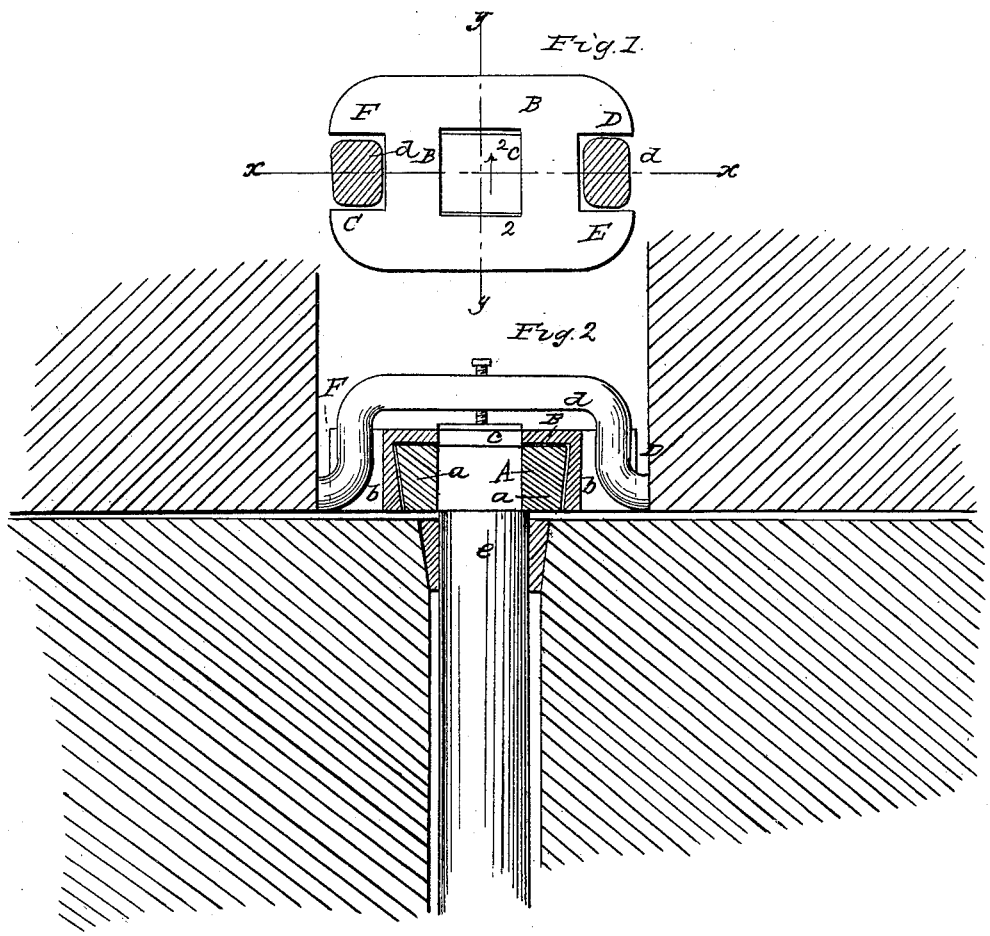
Witnesses
C. L. Topliff
J. W. B. Covington
Inventor
N. Shoemaker
By Munn & Co
Atty

UNITED STATES PATENT OFFICE.

NICHOLAS SHOEMAKER, OF MONTROSE, PENNSYLVANIA.

IMPROVEMENT IN GRINDING-MILLS.

Specification forming part of Letters Patent No. 51,227, dated November 28, 1865.

*To all whom it may concern:*

Be it known that I, NICHOLAS SHOEMAKER, of Montrose, in the county of Susquehanna and State of Pennsylvania, have invented a new and useful Improvement in Drivers for Millstones; and I do hereby declare that the following is a full, clear, and exact description thereof, which will enable those skilled in the art to make and use the same, reference being had to the accompanying drawings, forming part of this specification, in which—

Figure 1 is a detached plan or top view of my invention; Fig. 2, a vertical central section of the same applied to a pair of millstones, the invention being bisected in the line $x\,x$, Fig. 1; Fig. 3, a detached vertical section of the same taken in the line $y\,y$, Fig. 1.

Similar letters of reference indicate like parts.

This invention consists in a novel manner of constructing and arranging the driver on the spindle so that the former will be self-adjusting and adapt itself properly to the bail, and act equally at each end upon the runner or revolving millstone.

A represents a cross-bar or a horizontal piece of metal which is fitted on the upper part of the millstone-spindle, either permanently or in such a manner that it may be removed therefrom if necessary or desired. This bar A is of rectangular form, and its sides $a\,a$ are beveled or made of dovetail form, as shown clearly in Fig. 2, and its ends project from the spindle at equal distances, or, in other words, the spindle passes through the center of the bar.

B is the driver, provided at its ends with notches, or otherwise constructed so as to have two horns at each end. (Designated by D E C F.) This driver has a recess made transversely in it with dovetail or inclined sides $b\,b$, corresponding to the sides $a\,a$ of the bar A, and the bar A is fitted in said recess, the driver being allowed to slide freely on the bar, and a rectangular opening, $c$, is made centrally in the driver to admit of the spindle passing through it, said opening $c$ being wider in the direction 1 2 than in the opposite direction, in order to admit of the driver working or playing in the direction of 1 2. (See Fig. 1.)

The bail $d$ of the runner or revolving stone rests on the top of the spindle $e$, as usual, as shown in red in Fig. 2, and the lower parts of the bail fit in the notches, or between the horns D E C F of the driver. The spindle in rotating rotates the driver, and the bar A, which is fitted on the spindle, of course rotates the driver B, which communicates motion to the runner or revolving stone in consequence of the bail $d$ thereof fitting between the horns of the driver. The bail rotates in the direction indicated by the arrow 1, and the horns D C will bear against the bail $d$ and operate equally against both. Herein consists my improvement. If the horn D should strike the bail sooner than C, the pressure on D will move the driver on A in the direction indicated by arrow 2 until the horn C meets the bail. The device, therefore, is self-adjusting, and operates with mathematical accuracy in this respect, and will consequently exert a pressure equally at both ends against the runner or revolving stone.

Having thus described my invention, I claim as new and desire to secure by Letters Patent—

The horizontal bar A applied to the spindle of millstones, in connection with the driver B, provided with a recess to receive the bar A, substantially in the manner as and for the purpose set forth.

NICHOLAS SHOEMAKER.

Witnesses:
G. B. ELDRED,
DAVID SUMMERS.